United States Patent [19]

Sääksjärvi

[11] Patent Number: 4,539,636
[45] Date of Patent: Sep. 3, 1985

[54] APPARATUS FOR INTER-PROCESSOR DATA TRANSFER IN A MULTI-PROCESSOR SYSTEM

[75] Inventor: Paavo Sääksjärvi, Kirkkonummi, Finland

[73] Assignee: Elevator GmbH, Baar, Switzerland

[21] Appl. No.: 676,599

[22] Filed: Nov. 30, 1984

Related U.S. Application Data

[63] Continuation of Ser. No. 277,006, Jun. 24, 1981, abandoned.

[51] Int. Cl.³ .................. G06F 15/16; G06F 13/00; G06F 3/04
[52] U.S. Cl. ................................. 364/200
[58] Field of Search ... 364/200 MS File, 900 MS File

[56] References Cited

U.S. PATENT DOCUMENTS

| | | | |
|---|---|---|---|
| 3,771,137 | 11/1983 | Barner et al. | 364/200 |
| 4,219,873 | 8/1980 | Kober et al. | 364/200 |
| 4,223,380 | 9/1980 | Antonaccio et al. | 364/200 |
| 4,276,594 | 6/1981 | Morley | 364/200 |
| 4,320,450 | 3/1982 | Rose et al. | 364/200 |
| 4,342,083 | 7/1982 | Freedman et al. | 364/200 |
| 4,344,134 | 8/1982 | Barnes | 364/200 |
| 4,387,441 | 6/1983 | Kocol et al. | 364/200 |
| 4,402,046 | 8/1983 | Cox et al. | 364/200 |
| 4,417,334 | 11/1983 | Gunderson et al. | 370/85 |
| 4,470,114 | 9/1984 | Gerhold | 364/200 |
| 4,495,571 | 1/1985 | Staplin, Jr. et al. | 364/200 |

Primary Examiner—James D. Thomas
Assistant Examiner—Archie E. Williams, Jr.

[57] ABSTRACT

This procedure and apparatus is used for transferring data between central units or processors in a multi-processor system. The system includes one or several central units (3) with memories (4). The data to be transferred between central units (3) or processors are separated from their internal bus (6) by means of joint memories (2) and that the data transfer between the joint memories (2) is effected by a separate copying means (1).

5 Claims, 3 Drawing Figures

APPARATUS FOR INTER-PROCESSOR DATA TRANSFER IN A MULTI-PROCESSOR SYSTEM

This is a continuation of application Ser. No. 277,006, filed June 24, 1981, abandoned.

BACKGROUND OF THE INVENTION

The present invention concerns a procedure for transferring data between central units or processors in a multiple processor system comprising one or several central units with memories.

In multiprocessor systems most often two different techniques have been employed towards inter-processor data transfer: one is called the I/O technique and the second, the DMA technique. In the traditional I/O technique (Input/Output Technique) the processor reads the data sent by another processor one word or byte at a time and stores them in its memory, respectively reads one word or byte at a time from its memory and writes them to the other processor over a data transfer bus between them. Moreover, if the data transfer is fast, the writing processor must make sure that the reading processor has had time to read the preceding data before the next is written. This way of managing data transfer is comparatively slow owing to the fact that the processors have to perform several different operations in order to transfer one word or byte to the other. In addition, the use of the I/O technique slows down the execution of the processors' other programs because for the duration of said operations the execution of other programme has to be suspended, which furthermore necessitates extra processor state storings and returns. The I/O technique is usable only in data transfer events which are either slow or have a limited quantity.

The other way in which to manage inter-processor data transfer is the DMA (Direct Memory Access) technique, in which data are transferred from or to the processor's memory without any actual participation of the processor itself in the transfer event proper. This is most often implemented in that the processors participating in the transfer operation are stopped for the duration of the transfer event. One avoids in this way the extra storing and recalling operations occuring in the I/O technique and, moreover, the transfer may be fast because it can be carried out by a logic circuit made exactly for this purpose. In other words, the logic does not e.g. read and record; instead, it directly stores the arriving data in the memory. This mode however requires a fairly complex logic circuitry and therefore this technique is expensive. Furthermore, if the need of data transfer is high, the logic circuit begins to slow down the operation of the processor because the interruption times increase in length or they are repeated at a higher frequency. The same occurs when there are several processors writing to or reading from the same memory, because transfer in this manner is usually only possible between two processors at any one ttime. By the DMA technique such constructions have also been carried out in which the inter-processor data transfer takes place over a joint memory. The system in this case includes a memory which can be written to by all processors and which can be read by them, but this memory cannot be used but by one processor at the time, whence follows that any processor—or the DMA technique at least—has to await the termination of data transfer by the other logic circuit or circuits or processor/processors. It is possible in this way to deduct part of the interruptions caused by the DMA in the interfacing of more than two processors, but it is still possible that waiting for the transfer event proper becomes necessary. Other drawbacks of the DMA technique are its wide bus and the fast data transfer signals, which introduce a poor interference tolerance. The DMA technique is usable when the requirements of data transfer is high and there are not many pieces of apparatus needing simultaneous data transfer.

The purpose of the procedure and apparatus of the present invention is to eliminate the drawbacks mentioned and to provide a reliable and economical data transfer system in a multi-processor system.

SUMMARY OF THE INVENTION

The procedure of the invention is characterized in that the data to be transferred between central units are separated from the internal bus of these units by joint memories and that the data transfer between the joint memories is carried out by a separate copying means. The advantage is then gained that the data are transferred between the central units' memories without imposing any burden on the central units.

One favourable embodiment of the invention is characterized in that the copying means copies the writing block of each central unit simultaneously to all the others, into the equivalent block. The advantage is then that the synchronizing of the data processing processes carried out by the central units connected to these joint memories are facilitated because the copying means simultaneously updates the data in all joint memories.

Another favourable embodiment of the invention is characterized in that the copying means performs data transmitting without interruption while the system is in operation.

A third favourable embodiment of the invention is characterized in that the updating of data between the joint memories is carried out without in any way burdening the central units. The advantage is then that one central unit may have several joint memory buses, and it is not burdened by them.

Still one favourable embodiment of the invention is characterized in that the data transfer between the joint memories is performed in series mode 1 . . . n bits in parallel.

Still one favourable embodiment of the invention is characterized in that the addressing of data in the copying event is performed between the joint memories by the aid of special address counters which are synchronized by the copying means. The advantage common to these two embodiments is that the joint memory bus may be kept narrow since no address data need be transferred therein. Moreover, the narrow bus width and the permissible slowness thereof imply that the manufacturing costs of this bus may be lowered and the central units which will be connected thereto can be rather easily galvanically isolated, this expedient also reducing the manufacturing costs.

The invention also concerns an apparatus for carrying out the procedure mentioned. The apparatus comprises one or several central units with memories. The apparatus is characterized in that to the joint memory bus has been connected a copying means and for each central unit a joint memory, which has been connected by a local bus to the preceding central unit. The advantage is then that the joint memory bus does not impose any burden on the central units connected to it. It is a further advantage that the central units may carry out the normal writing and reading operations by means of the joint memories. There is further the advantage of the low price of this apparatus.

BRIEF DESCRIPTION OF THE DRAWING

In the following, the invention is described in greater detail with the aid of an example and with reference to the attached drawings, wherein.

DESCRIPTION OF THE PREFERRED EMBODIMENT

Figure 1:
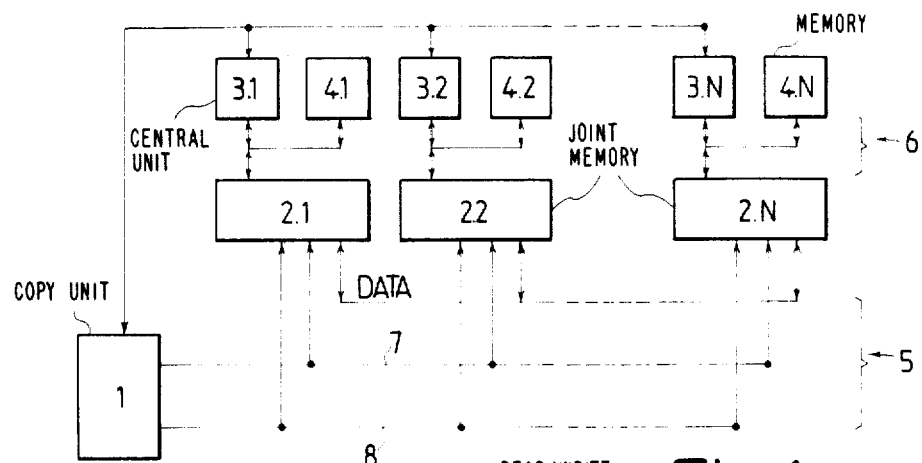
FIG. 1 presents the principle of the invention in a bloak diagram.
Figure 2:
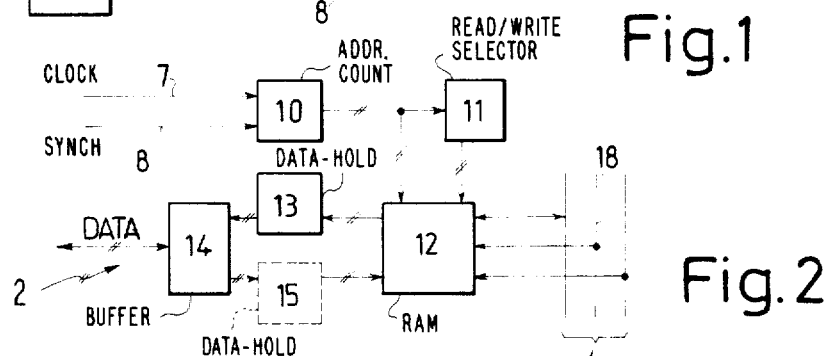
FIG. 2 shows the construction of the joint memory with its ancillary circuits, as a block diagram.
Figure 3:
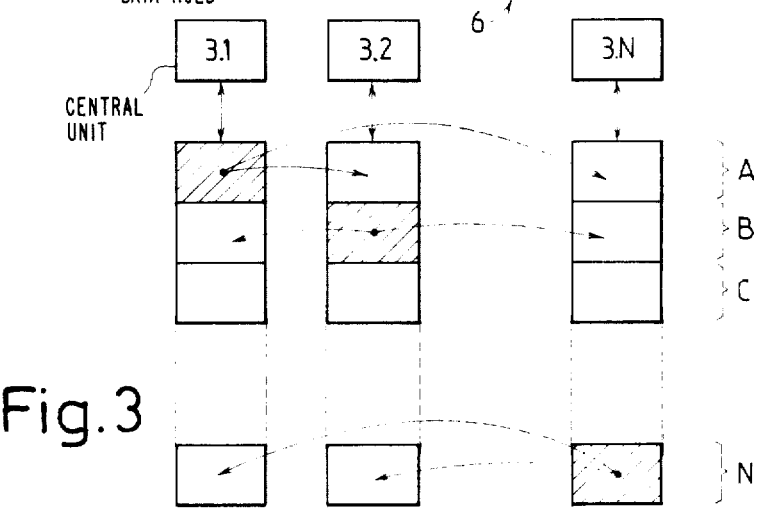
FIG. 3 illustrates the memory copying event and the arrangement of data storage of the writing blocks in the joint memories of FIG. 1.

For the sake of clarity, the description of the invention has here been confined to talk concerning data transfer between central units. However, all that is described here is also applicable e.g. to data transfer between the central units' internal processors without substantially changing anything. For instance, when speaking of a "central unit", this word may be imagined replaced by "processor" as well, in the procedure of this invention. In the procedure of the invention is used a very simple processor which shall be termed the copying means (1) in the following, and which transfers the data between the joint memories (2). The data transfer takes place along a joint memory bus (5). The connection from the joint memory bus (5) to the central units (3) has been established by mediation of each central unit's own so-called joint memory (2) and a local bus (6). The joint memory bus (5) is driven with a frequency so slow, and in synchronism with the central units (3), so that the use of the central unit's (3) joint memory (2) has no influence on the operation of the joint memory bus (5). Another, slightly more expensive way to make the operation of the central unit's (3) joint memory (2) such that it has no effect on the operation of the joint memory bus (5) is intercalating the operation of the joint memory bus (5) with regard to the timing of the central units' (3) internal bus so that the jont memory bus (5) uses the joint memories (2) during those time itervals when the central units (3) cannot be active towards the joint memories (2). The joint memories (2) have furthermore been subdivided into a number of sections (A,B,C, . . . , N). The copying means (1) copies the writing memory or block of each central unit (3), shown as a shaded block in FIG. 3, to all others to the corresponding block, simultaneously.

The copying means (1) of the joint memory bus (5) is a clock generator which has been synchronized with the central units (3) to be connected to the joint memory bus (5) in such a way that there are time intervals during which no changes occur in the address bus (18) of any central unit (3) and during which the address changes of the joint memory bus (5) can be carried out. The central unit addresses the joint memory by the address bus (18). The copying means (1) generates to the joint memory bus (5) the following kinds of signals, at least: a clock pulse (7), by which the address counters (10) of all joint memories (2) increment, and a synchronizing pulse (8), with the aid of which all address counters (10) are checked once at least on every copying round.

The basis for the operation of the joint memory use is that each copying on the joint memory bus (5) takes place slowly enough to permit the central unit (3) in the middle of a copying event to read from or write to the joint memory (2) without this interfering with the operation of the joint memory bus (5)—that is, the central unit (3) "steals" time from the joint memory (2), or the operation is intercalated, as described earlier already. The task of the address counter (10) is to operate in step with the clock pulse (7) from the copying means (1) and to count the address to a RAM type memory (12). Synchronisation is effected by means of a synchronizing signal (8). The unit (11) may be called the read/write selection unit. This is a logic unit performing the selection between the read and write blocks described and their timing. The outgoing data holding unit (13) takes care that the data on the bus (5) remains unchanged in case the central unit (3) wants to use the RAM memory (12) while writing to the bus (5) is going on. It is also conceivable that one might to the circuit add an incoming data holding unit (15). The RAM unit has ports towards the bus (6) of the central unit (3) as well as to the joint memory bus (5). The bus buffers (14) are circuits which adapt the RAM memory (12) and the joint memory bus (5) to be electrically compatible.

It is obvious to a person skilled in the art that the invention is not exclusively confined to the example presented above and that, instead, its embodiments may vary within the scope of the claims stated below.

What is claimed is:

1. A system for transferring data between central units of processors in a multi-processor system, said system comprising central units with central memories, an internal bus for the transmission of data between individual ones of said central units, joint memories, and copying means for clocking the joint memories; and wherein the central units of processors are separated from said internal bus by said joint memories, a data transfer among all the joint memories is effected by said copying means;

each of said joint memories includes its own address generation means responsive to common clock synchronization signals of the copying means transmitted to all of the joint memories for simultaneous transfer of data without transference of address signals among all the joint memories and;

all of said address generation means generate the same address concurrently in response to said clock synchronization signals without a computation of separate addresses, thereby permitting continuous transfer of data independently of any normal operation of said central units.

2. A system according to claim 1, characterized in that timing signals of the copying means provide for the copying of data of a writing block associated with a central unit or processor to the corresponding blocks of other ones of said central units simultaneously, the writing block being a portion of a joint memory.

3. A system according to claim 1, characterized in that transfer of data between the joint memories is carried out completely without burdening the central units or the processors.

4. A system according to claim 1, wherein, in each if said joint memories, said generation means includes an address counter, and wherein the addressing of data in a copying operation of said copying means is carried out between the joint memories by means of said address counters, said counters being synchronized by the copying means.

5. A system according to claim 1 wherein for each central unit of processor, one of said joint memories is connected to a corresponding central unit or processor.

* * * * *